United States Patent
Aubert et al.

(10) Patent No.: US 6,221,473 B1
(45) Date of Patent: Apr. 24, 2001

(54) RARE-EARTH AND ALKALI SULPHIDE, METHOD FOR PREPARING SAME AND USE THEREOF AS A PIGMENT

(75) Inventors: Maryline Aubert, Angliers; Pierre Macaudiere, Asnieres-sur-Seine, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/043,354

(22) PCT Filed: Sep. 13, 1996

(86) PCT No.: PCT/FR96/01418

§ 371 Date: Jul. 20, 1998

§ 102(e) Date: Jul. 20, 1998

(87) PCT Pub. No.: WO97/11031

PCT Pub. Date: Mar. 27, 1997

(30) Foreign Application Priority Data

Sep. 18, 1995 (FR) .................................................. 95 10893

(51) Int. Cl.$^7$ .............................. B32B 5/66; C01F 17/00; C01D 1/00
(52) U.S. Cl. .................... 428/221; 106/408; 423/21.1; 423/179; 423/263; 423/511; 428/323; 428/402; 428/403
(58) Field of Search .................... 428/402, 323, 428/221, 403; 106/461, 14.45, 408, 287.32; 423/21.1, 179, 263, 511

(56) References Cited

U.S. PATENT DOCUMENTS

| | | | | |
|---|---|---|---|---|
| 3,970,582 | * | 7/1976 | Fan et al. | 252/301.6 S |
| 4,374,037 | * | 2/1983 | Takahashi | 252/301.4 |
| 4,612,292 | * | 9/1986 | Richard | 501/27 |
| 5,127,952 | * | 7/1992 | Persello et al. | 106/492 |
| 5,348,581 | * | 9/1994 | Chopin et al. | 106/461 |
| 5,401,309 | * | 3/1995 | Chopin et al. | 106/461 |
| 5,755,868 | * | 5/1998 | Macaudiere | 106/401 |

* cited by examiner

Primary Examiner—H. Thi Le
(74) Attorney, Agent, or Firm—Jean-Louis Seugnet

(57) ABSTRACT

The present invention concerns a sulfide of a rare earth and an alkali, a process for its preparation and its use as a colored pigment. The sulfide is characterized in that it has the formula $ABS_2$ where A represents at least one alkali and B represents at least one rare earth and in that it is constituted by grains with an average size of 1.5 μm at most. The preparation process for the sulfide is characterized in that at least one rare earth carbonate or hydroxycarbonate is brought into the presence of at least one gas selected from hydrogen sulfide or carbon disulfide. The product obtained is optionally deagglomerated. The sulfide can be used as a pigment in plastics, paints, finishes, rubbers, ceramics, glazes, paper, inks, cosmetics, dyes, laminated coatings and materials based on or obtained from at least one inorganic binder.

17 Claims, No Drawings

RARE-EARTH AND ALKALI SULPHIDE, METHOD FOR PREPARING SAME AND USE THEREOF AS A PIGMENT

CROSS-REFERENCES TO RELATED APPLICATIONS

This application is an application under 35 U.S.C. Section 371 of International Application Number PCT/FR96/01418, filed Sep. 13, 1996.

The present invention concerns a sulfide of a rare earth and an alkali, a process for its preparation and its use as a colored pigment.

Inorganic colored pigments are already widely used in a variety of industries, in particular paint, plastics and ceramics. In these applications, properties which are, among others, thermal and/or chemical stability, dispersibility (the ability of a product to be properly dispersed in a given medium), intrinsic color, coloring power and opacifying power, constitute a number of particularly important criteria which must be taken into consideration when selecting a suitable pigment.

Unfortunately, the majority of inorganic pigments which are suitable for applications such as those listed above and which are currently used on an industrial scale generally contain metals (in particular cadmium, lead, chromiunm or cobalt), the use of which is becoming ever more strictly regulated or even prohibited under the law of numerous countries because they are considered to be highly toxic. Particular non-limiting examples are red pigments based on cadmium selenide and/or cadmium sulphoselenide, for which we have already proposed substitutes based on rare earth sulfides. Compositions based on sesquisulfides of a rare earth and alkaline elements have also been described in European patent EP-A-0 545 746. Such compositions have proved to be particularly interesting substitutes.

However, there is a need for a wider range of pigment quality products.

The aim of the present invention is to provide such a range of products.

BRIEF SUMMARY OF THE INVENTION

The invention thus provides a sulfide of a rare earth and an alkali, characterized in that it has the following formula:

$ABS_2$ where A represents at least one alkali and B represents at least one rare earth, and in that it is constituted by grains with an average size of 1.5 $\mu$m at most.

In a further embodiment of the invention, the sulfide is characterized in that it has the above formula and in that it is constituted by whole grains with an average size of 1.5 $\mu$m at most.

In a third embodiment of the invention, the sulfide is characterized in that it has the above formula and in that it is constituted by agglomerates which are constituted by grains with an average size of 1.5 $\mu$m at most.

The invention also concerns a process for the preparation of a rare earth sulfide as defined above which is characterized in that at least one rare earth carbonate or hydroxycarbonate is brought into contact with at least one compound of an alkaline element and they are heated in the presence of at least one gas selected from hydrogen sulfide or carbon disulfide and the product obtained is optionally deagglomerated.

DETAILED DESCRIPTION OF THE INVENTION

Other characteristics, details and advantages of the invention will become apparent from the following description and non limiting illustrative examples.

The rare earth sulfide of the invention has the general formula given above. Throughout the present description, the term "rare earth" means elements from the group constituted by yttrium and elements from the periodic classification which have an atomic number between 57 and 71 inclusive.

In one particular embodiment of the invention, the rare earth is cerium or lanthanum.

In a further embodiment of the invention, the alkali is sodium combined with potassium or lithium.

Particular examples of products of the invention are: $KCeS_2$, $NaCeS_2$, and more generally products with formulae $KCe_{1-x}La_xS_2$ or $K_xNa_{1-x}CeS_2$ ($0 \leq x \leq 1$), the latter having a color spread from the color of $KCeS_2$ to that of $NaCeS_2$.

An important feature of the sulfides of the invention is their granulometry. These products are constituted by grains with an average size of 1.5 $\mu$m at most, more particularly at most 1 $\mu$m. Throughout the description, the sizes given are measured using a CILAS granulometer.

In a further embodiment of the invention, the products are constituted by whole grains of the same average size. The term "whole grain" means a grain which has not been broken or crushed. Grains can be broken or crushed during grinding. Scanning electron microscope photographs of the product of the invention demonstrate that the grains forming it have not been crushed. This is due to the fact that the sulfides of the invention are deagglomeratable, i.e., if they are not directly in the form of whole grains, they can be in the form of agglomerates which are themselves constituted by grains which are agglomerated and/or slightly sintered which, on deagglomeration under mild conditions, for example air jet grinding, can produce whole grains.

The process for the preparation of the sulfides of the invention will now be described.

As seen above, the process of the invention consists of bringing at least one rare earth carbonate or hydroxycarbonate into the presence of at least one compound of an alkaline element and heating them in the presence of at least one gas selected from hydrogen sulfide and carbon disulfide and, optionally, deagglomerating the product obtained.

It is advantageous to use a carbonate or hydroxycarbonate with a fine granulometry, in particular with an average size of 1 $\mu$m at most.

Examples of alkali compounds which are suitable for use in this process. are alkali oxides, hydroxides, sulfides, polysulfides or sulphates, and oxycarbonated compounds such as alkaline oxalates, carbonates or alkali acetates.

The initial mixture can, of course, comprise several compounds of rare earths and/or alkalis.

The compounds cited above are mixed in the necessary stoichiometric proportions.

In a particular variation of the invention, the rare earth carbonate or hydroxycarbonate and the alkali element compound are mixed in water to form a solution or a suspension. The mixture obtained is then dried by spray-drying, i.e., spraying the mixture into a hot atmosphere. Any known spraying apparatus can be used for spray-drying, for example a sprinkler rose or similar spray nozzle. As an example, the gas temperature when spraying is started is usually in the range 200° C. to 300° C., and at the outlet can be between 100° C. and 200° C.

The mixture obtained after drying is then heated as described above.

The sulphiding gas used in the process of the invention may be hydrogen sulfide or carbon disulfide. In a preferred implementation of the invention, a mixture of these gases is used.

The sulphiding gas or gas mixture can be used with an inert gas such as argon or nitrogen.

Heating is generally carried out at a temperature in the range 800° C. to 1000° C., the high temperatures encouraging the production of pure product phases.

The heating period corresponds to the time required to obtain the desired sulfide; this period is shorter as the temperature increases.

The reaction is generally carried out at a partial moulding machinery of hydrogen sulfide and/or carbon disulfide which is in the range 0.1 Pa to $1 \times 10^5$ Pa.

Finally, the process can be carried out in an open reactor.

After heating, a product is obtained which has the granulometry given above or which, by simple deagglomeration or gentle grinding, can produce that granulometry.

Particular variations of the sulfides of the invention will now be described.

In a first variation, the sulfide comprises a layer based on at least one transparent oxide deposited on the surface or periphery.

The transparent oxide and its preparation process are described in our French patent application FR-A-2 703 999, which is hereby incorporated by reference.

In this variation, the product of the invention comprises a sulfide as described above which forms a nucleus, surrounded by a peripheral layer of transparent oxide.

Some variations of this structure are possible, of course. In particular, the peripheral layer surrounding the sulfide need not be perfectly continuous or homogeneous. However, the products of the invention are preferably constituted by a uniform coating layer of transparent oxide of controlled thickness, in a manner such that the original color of the sulfide before coating is not altered.

The term "transparent oxide" means an oxide which, once deposited on the sulfide in the form of a thick or thin film, will not, or only slightly, absorb light in the visible region, so as not to mask or only slightly mask the intrinsic original color of the sulfide. Further, it should be noted that the term "oxide", which is used for convenience throughout the present description, should be taken to include hydrated oxides.

These oxides or hydrated oxides can be amorphous and/or crystalline.

Particular examples of such oxides are silicon oxide (silica), aluminium oxide (alumina), zirconium oxide (zirconia), titanium oxide, zirconium silicate $ZrSiO_4$ (zircon) and rare earth oxides. In a preferred embodiment of the present invention, this coating layer is essentially, and preferably uniquely, constituted by, silica.

A preparation process for coating layer compositions can consist of bringing the sulfide obtained after heating in the presence of hydrogen sulphidle and/or carbon disulfide into contact with a precursor of the oxide which is to form the layer, and precipitating the oxide. Processes for the precipitation of oxides and precursors have been described, in particular in FR-A-2 703 999.

The silica can be prepared by hydrolysing an alkyl silicate by forming a reaction medium by on nixing water, an alcohol, a sulfide which is taken into suspension, and possibly a base, then introducing the alkyl silicate, or it can be prepared by reacting a sulfide, an alkaline silicate and an acid.

For an alumina based layer, the sulfide, an aluminate and an acid can be reacted to precipitate alumina. This precipitation can also be obtained by reacting the sulfide, an aluminium salt and a base.

Finally, the alumina can be formed by hydrolysing an aluminium alcoholate.

The titanium oxide can be precipitated by introducing a titanium salt such as $TiCl_4$, $TiOCl_2$ or $TiOSO_4$ and a base into an aqueous suspension of sulfide. As another example, an alkyl titanate can be hydrolysed or a titanium sol can be precipitated out.

Finally, for a zirconium oxide based layer, a suspension of cerium sulfide can be co-hydrolysed or co-precipitated in the presence of an organometallic zirconium compound, for example a zirconium alkoxide such as zirconium isopropoxide.

In another variation, the sulfide of the invention may contain fluorine atoms.

Reference should be made in respect of this variation to the disposition of fluorine atoms and the preparation process described in our French patent application FR-A-2 706 476, which is hereby incorporated by reference.

The fluorine-containing sulfides preferably have at least one of the following features:
   the fluorine atoms are distributed in a concentration gradient which decreases from the surface to the core of the sesquisulfides;
   the majority of the fluorine atoms are located at the external periphery of the sesquisulfides. The term "external periphery" here means a thickness, measured from the particle surface, of the order of several tens of Angstroms. Further, the term "majority" means more than 50% of the fluorine atoms present in the sesquisulfide are located in the external periphery;
   the percentage by weight of fluorine atoms present in the sesquisulfide does not exceed 10%, preferably 5%;
   the fluorine atoms are present in the form of fluorinated or sulphofluorinated compounds, in particular in the form of rare earth fluorides or rare earth sulphofluorides (thiofluorides).

The preparation process for products of this variation consists of bringing a sulfide obtained from heating with hydrogen suilphide and/or carbon disulfide into contact with a fluorinating agent and causing them to react.

Fluorination can be carried out using any known technique.

In particular, the fluorinating agent may be liquid, solid or gaseous. Preferably, the treatment conditions are such that the fluorinating agent is liquid or gaseous.

Particular examples of suitable fluorinating agents for carrying out the treatment of the invention are fluorine $F_2$, halogen fluorides, ammonium fluoride, rare gas fluorides, nitrogen trifluoride $NF_3$, boron trifluoride $BF_3$, tetrafluoromethane, and hydrofluoric acid HF.

When treating in a fluorinating atmosphere, the fluorinating agent can be used pure or diluted in a neutral gas, for example nitrogen.

The reaction conditions are preferably selected so that the treatment only causes fluorination at the sulfide surface (mild conditions). In this respect, fluorinating the sulfide core would not substantially improve the results over essentially surface fluorination. In practice, the progress of the fluorination reaction can be monitored and controlled, for example by measuring the livering of the materials (livering is caused by progressive introduction of fluorine).

A third variation of the products of the invention concerns fluorinated products of the type which have just been described but which are also encapsulated by a transparent oxide layer.

In this case, a composite product is obtained, more precisely a composite constituted by a fluorinated sulfide as obtained and defined above and a layer based on at least one transparent oxide deposited on the surface of the sulfide and coating the latter.

The above description concerning the production process for such a layer is also applicable in this instance.

In a final variation, the product comprising a layer based on at least one transparent oxide deposited on its surface is fluorinated. This product can be obtained by bringing the sulfide produced by heating in the presence of hydrogen sulfide or carbon disulfide into contact with a transparent oxide precursor then precipitating the oxide. The product obtained is then fluorinated as described above.

The sulfides of the invention have particular use as colored pigments. Their color varies from yellow to brown depending on the elements contained in the compositions.

They have coloring power and covering power and thus are suitable for coloring a number of materials such as plastics, paints, etc.

More precisely, they can be used to color plastic materials which may be thermoplastic or thermosetting.

Purely illustrative examples of thermoplastic resins which can be colored are polyvinyl chloride, polyvinyl alcohol, polystyrene, styrene-butadiene copolymers, styrene-acrylonitrile copolymers, acrylonitrile-butadiene-styrene (ABS) copolymers, acrylic polymers such as polymethyl methacrylate, polyolefins such as polyethylene, polypropylene, polybutene, polymethylpentene, cellulosic derivatives such as cellulose acetate, cellulose acetobutyrate, ethylcellulose, and polyamides, for example polyamide 6—6.

Examples of thermosetting resins for which the sulfides of the invention are suitable are phenoplasts, aminoplasts in particular urea-formol copolymers, and melamine-formol copolymers, epoxy resins and thermosetting polyesters.

The sulfides of the invention can also be used in special polymers such as fluorinated polymers, in particular polytetrafluoroethylene (PTFE), polycarbonates, silicone elastomers and polyimides.

For the specific application of coloring plastics, the sulfides of the invention can be used directly in the form of powders. They can also, anad preferably, be used in a pre-dispersed form, for example premixed with a portion of the resin, in the form of a concentrated paste or a liquid which means that they can be introduced at any stage of the resin manufacturing process.

Thus the sulfides of the invention can be incorporated into plastic materials such as those mentioned above in a proportion by weight which is generally either 0.01% to 5% (with respect to the final product) or 40% to 70% in the case of a concentrate.

The sulfides of the invention can also be used in paints and finishes, more particularly in the following resins: alkyd resins, the most common of which is glycerophthalic resin; resins modified with long or short oil; acrylic resins derived from acrylic acid esters (methyl or ethyl) and methacrylic acid which may be copolymerised with ethyl, 2-ethylhexyl or butyl acylate; vinyl resins such as polyvinyl acetate, polyvinyl chloride, polyvinylbutyral, polyvinylformal, and copolymers of vinyl chloride and vinyl acetate or vinylidene chloride; aminoplast or phenolic resins, usually modified; polyester resins; polyurethane resins; epoxy resins; and silicone resins.

The sulfides are generally used in an amount of 5% to 30% by weight of the paint, and 0.1% to 5% by weight of the finish.

Finally, the sulfides of the invention are also suitable for use in the rubber industry, in particular for floor coatings, in the paper and printing ink industries, in the cosmetics industry and in numerous other areas, non limiting examples of which are dyes, leather finishing and in laminated coatings for kitchens and other work surfaces, in ceramics and in glazes.

The products of the invention can also be used to color materials based on or obtained from at least one inorganic binder.

The inorganic binder can be selected from hydraulic binders, air setting binders, plaster and anhydrous or partially hydrated calcium sulphate type binders.

The term "hydraulic binders" means substances which can set and harden after addition of water by forming hydrates which are insoluble in water. The products of the invention are particularly suitable for coloring cements and concrete made from those cements by addition to the latter of water, sand and/or gravel.

Within the context of the present invention, the cement can, for example, be aluminous. This means any cement containing a high proportion of either alumina itself or an aluminate, or both. An example is a calcium aluminate based cement, in particular a SECAR type cement.

The cement can also be a silicate type cement, more particularly a calcium silicate based cement. Examples are PORTLAND cements, among them rapid set or very rapid set Portland cements, white cements, sulphate resistant cements and those containing blast furnace slag and/or fly ash and/or meta-kaolin.

Calcium sulphate hemihydrate-based cements can also be mentioned, along with magnesia cements known as Sorel cements.

The products of the invention can also be used to color air setting binders, i.e., binders which harden in free air by the action of $CO_2$, which are based on calcium or magnesium oxide or hydroxide.

Finally, the products of the invention can be used to color plaster and anhydrous or partially hydrated calcium sulphate type binders ($CaSO_4$ and $CaSO_4$, ½ $H_2O$).

Finally, the invention concerns colored materials, in particular plastics, paints, finishes, rubbers, ceramics, glazes, papers, inks, cosmetics, dyes, leathers, laminated coatings or materials obtained from at least one inorganic binder, containing a sulfide as defined above.

Examples will now be given.

In the examples, the chromatic co-ordinates $L^*$, $a^*$ and $b^*$ are given in the CIE 1976 ($L^*$, $a^*$ & $b^*$) system as defined by the "Commission Internationale d'Eclairage" [International Commission on Illumination, ICI] and defined in French standard (AFNOR), colorimetric color No X08-12 (1983). The measurements on the products and plastics were carried out using a colorimeter sold by Pacific Scientific. The illuminant was D65. The observation surface was a circular chip with a surface area of 12.5 cm². The observation conditions corresponded to viewing at a 10° aperture angle. The measurements given exclude the specular component. For measurements made on paints, the colorimeter used was a Data Color and the illuninant was C10.

EXAMPLE 1

This example concerns the synthesis of $NaCeS_2$ and its use as a pigment.

A pulp of micronic cerium hydroxycarbonate was spray dried (inlet temperature: 240° C.; outlet temperature: 110° C.) in the presence of sodium carbonate in an amount such that the Na/Ce ratio equalled 1.

The dried product was placed in a vitreous carbon boat then heated to 800° C. for one hour in a stream of argon, $H_2S$ and $CS_2$.

After cooling, the powder was simply deagglomerated to produce a dark red product with a granulometry of 0.7 micron and the following colorimetric co-ordinates:

L=43.8;
a=38.6;
b=23.0

20 g of the synthesised pigment was mixed with 2 kg of a polypropylene with reference ELTEX® PHV 001 in a revolving drum. The mixture was then injected at 220° C. using an Arburg 350-90-220D injection moulding machine with a 41 s cycle. The mould was maintained at 35° C.

A double thickness parallelepipedal sample was obtained (2 mm and 4 mm).

The pigment had dispersed well. The chromatic co-ordinates, measured on the thick part of the plate, were as follows:

L=39.6;
a=37.1;
b=20.5.

EXAMPLE 2

This example concerned a fluorine-containing product obtained from the product of Example 1.

Wet fluoriding was carried out using ammonium fluoride. 10 g of the product was introduced into 100 ml of an ammonium fluoride solution (5% by weight).

The pH of the mixture was brought to 8 by addition of an ammonia solution and the mixture was stirred for one hour.

The product was filtered then dried in a vacuum desiccator.

A product was obtained which had the following improved chromatic co-ordinates:

L=41;
a=41;
b=25.6.

EXAMPLE 3

This example concerns the synthesis of $KCeS_2$ and its use as a pigment.

A pulp of rnicronic cerium hydroxycarbonate was spray dried (inlet temperature: 240° C.; outlet temperature: 110° C.) in the presence of potassium carbonate in an amount such that the K/Ce ratio equalled 1.

The dried product was placed in a vitreous carbon boat then heated to 800° C. for one hour in a stream of argon, $H_2S$ and $CS_2$.

After cooling, the powder was simply deagglomerated to produce an orange product with an average granulometry of 1 micron and the following colorimetric co-ordinates:

L=63.3;
a=34.7;
b=71.1

20 g of the synthesised pigment was mixed with 2 kg of a polypropylene with reference ELTEX® PHV 001 in a revolving drum. The mixture was then injected at 220° C. using an Arburg 350-90-220D injection moulding machine with a 41 l/s cycle. The mould was maintained at 35° C.

A double thickness parallelepipedal sample was obtained (2 mm and 4 mm).

The pigment had dispersed well. The chromatic co-ordinates, measured on the thick part of the plate, were as follows:

L=58.8;
a=25.2;
b=61.1.

EXAMPLE 4

This example concerns the synthesis of $K(Ce_{0.8}La_{0.2})S_2$.

A pulp of micronic mixed cerium and lanthanum hydroxycarbonate with a molar ratio of 80-20 was spray dried (inlet temperature: 240° C.; outlet temperature: 110° C.) in the presence of potassium carbonate in an amount such that the K/Ce+La ratio equalled 1.

The dried precursor was placed in a vitreous carbon boat then heated to 800° C. for one hour in a stream of argon, $H_2S$ and $CS_2$.

After cooling, the powder was simply deagglomerated to produce a dark red product with an average granulometry of 1.1 micron and the following colorimetric co-ordinates:

L=63.3;
a=25.7;
b=70.6

EXAMPLE 5

This example concerns the synthesis of $K(Ce_{0.8}Dy_{0.2})S_2$.

The method used in Example 4 was used, replacing the lanthanum with dysprosium.

A product was obtained which, after deagglomeration, had a granulometry of 1.1 $\mu$m and the following colorimetric co-ordinates:

L=65.5;
a=34.2;
b=59.8.

EXAMPLE 6

This example concerns the synthesis of $NaYbS_2$.

The method of Example 1 was used, replacing the cerium with ytterbium.

A yellow product was obtained which, after deagglomeration, had a granulometry of 0.95 $\mu$m and the following colorimetric co-ordinates:

L=78.9;
a=3.8;
b=24.0.

EXAMPLE 7

This example concerns the synthesis of $KYbS_2$.

The method of Example 3 was used, replacing the cerium by ytterbium.

A yellow product was obtained which, after deagglomeration, had a granulometry of 0.90 $\mu$m and the following colorimetric co-ordinates:

L=79;
a=3.5;
b=33.8.

What is claimed is:

1. A sulfide of a rare earth and an alkali, having the following formula:

$$ABS_2$$

wherein A represents at least one alkali and B represents at least one rare earth, and wherein it is constituted by grains with an average size of 1.5 μm at most.

2. A sulfide according to claim 1, wherein B is cerium.

3. A sulfide according to claim 1, wherein it further contains fluorine.

4. A process for the preparation of a rare earth sulfide as defined in claim 3, comprising the steps of:
   a) bringing into contact at least one rare earth carbonate or hydroxycarbonate with at least one compound of an alkali element,
   b) heating said rare earth carbonate or hydroxycarbonate and the compound of an alkali element in the presence of hydrogen sulfide or carbon disulfide to obtain a rare earth sulfide, and
   d) reacting the rare earth sulfide obtained from step b) with a fluorinating agent.

5. A sulfide according to claim 1, wherein the fluorine atoms are distributed in a concentration gradient which decreases from the sulfide surface to its core.

6. A sulfide according to claim 1, further comprising a layer based on at least one transparent oxide deposited on the sulfide surface or its periphery.

7. A process for the preparation of a rare earth sulfide as defined in claim 6, comprising the steps of:
   a) bringing into contact at least one rare earth carbonate or hydroxycarbonate with at least one compound of an alkali element,
   b) heating said rare earth carbonate or hydroxycarbonate and the compound of an alkali element in the presence of hydrogen sulfide or carbon disulfide to obtain a rare earth sulfide,
   e) bringing into contact the rare earth sulfide obtained from step b) with a precursor of a transparent oxide, and then
   f) precipitating the transparent oxide of said precursor.

8. A process for the preparation of a rare earth sulfide as defined in claim 1, comprising the steps of:
   a) bringing into contact at least one rare earth carbonate or hydroxycarbonate with at least one compound of an alkali element, and
   b) heating said rare earth carbonate or hydroxycarbonate and the compound of an alkali element in the presence of hydrogen sulfide or carbon disulfide.

9. A process according to claim 8, wherein step a) further comprising bringing into contact the rare earth carbonate or hydroxycarbonate with the alkali element compound in water to obtain a mixture and spray drying said mixture.

10. A process according to claim 8, wherein, in step b), a mixture of hydrogen sulfide and carbon disulfide is used.

11. A process of coloring materials, comprising the step of adding to said materials a rare earth sulfide as defined in claim 1.

12. A process according to claim 11, wherein said materials are plastics, paints, finishes, rubbers, ceramics, glazes, papers, inks, cosmetics, dyes, leathers, laminated coatings or inorganic binders.

13. Composition of matter comprising a material selected from the group consisting of plastics, paints, finishes, rubbers, ceramics, glazes, papers, inks, cosmetics, dyes, leathers, laminated coatings inorganic binders, said material being colored with a rare earth sulfide as defined in claim 1.

14. A sulfide of a rare earth and an alkali, having the following formula:

$$ABS_2$$

wherein A represents at least one alkali and B represents at least one rare earth, and wherein it is constituted by whole grains with an average size of 1.5 μm at most.

15. A sulfide according to claim 14, wherein B is cerium.

16. A sulfide of a rare earth and an alki, wherein it has the following formula:

$$ABS_2$$

wherein A represents at least one alkali and B represents at least one rare earth, and wherein it is constituted by agglomerates which are themselves constituted by grains with an average size of 1.5 μm at most.

17. A sulfide according to claim 16, wherein B is cerium.

* * * * *